H. H. HUMPHREY & HENRY BICKFORD.
Improvement in Scroll-Saws.
No. 115,210.                                         Patented May 23, 1871.
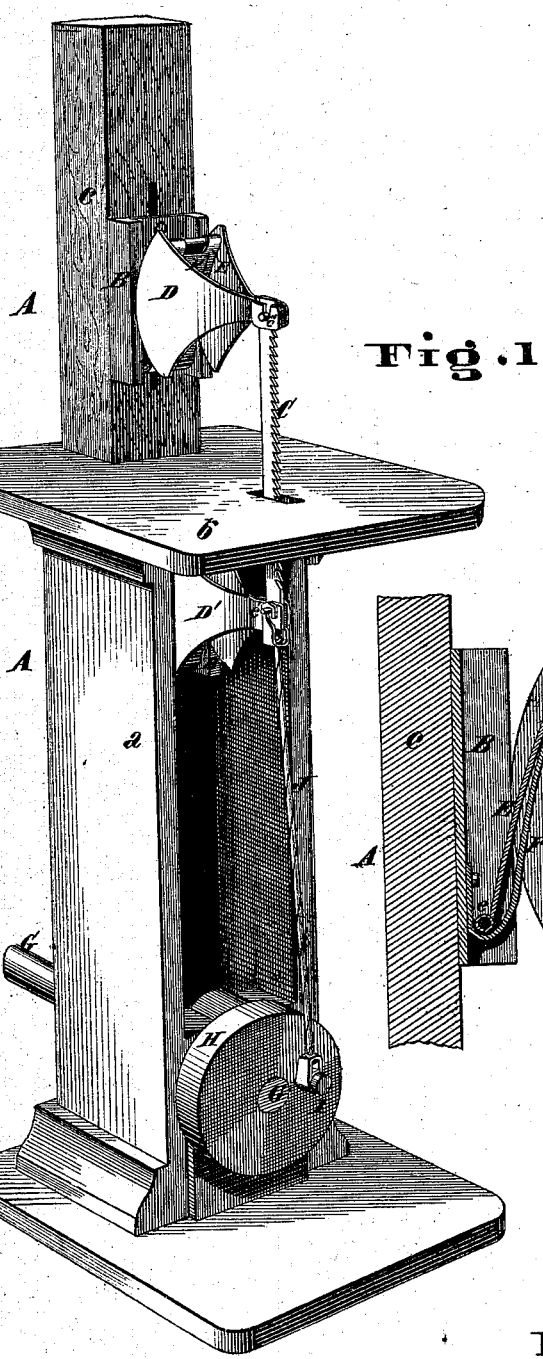
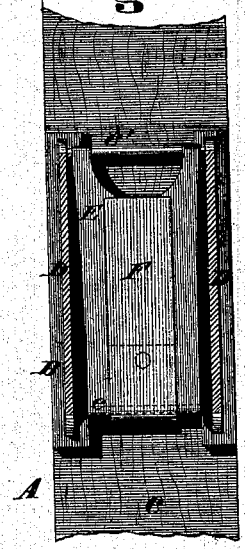
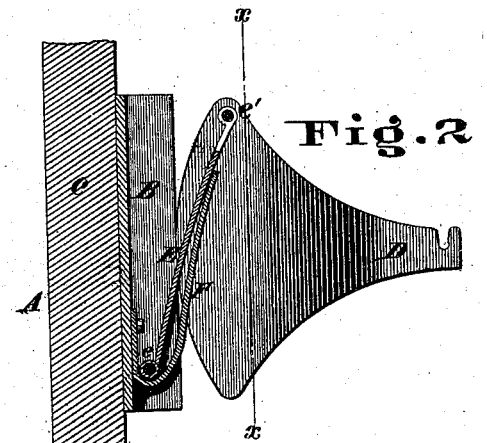

UNITED STATES PATENT OFFICE

HUGH H. HUMPHREY AND HENRY BICKFORD, OF CINCINNATI, OHIO, ASSIGNORS TO HENRY BICKFORD.

IMPROVEMENT IN SCROLL-SAWS.

Specification forming part of Letters Patent No. 115,210, dated May 23, 1871.

We, HUGH H. HUMPHREY and HENRY BICKFORD, both of Cincinnati, Hamilton county, State of Ohio, have invented a certain new and useful Improvement in Scroll-Saws, of which the following is a specification:

Nature and Objects of Invention.

Our invention consists, first, in a peculiar combination of frame, saw, and rolling arms, the latter connecting the saw with the frame and serving as nearly-frictionless guides for the vertically-reciprocating motion of the saw; second, in the provision, in connection with the rolling arms, saw, and frame, of springs for stretching the saw and confining the rolling arms.

Description of the Accompanying Drawing.

Figure 1 is a perspective view of a scroll-saw embodying our invention. Fig. 2 is a section through the arms of the saw in a direction from front to rear of the machine. Fig. 3 is a section through the arms of the saw in a direction at right angles to Fig. 2, and through the line X X.

General Description.

The frame A is composed of a column, $a$, table $b$, and post $c$. The post $c$, for some classes of work, may be built up from the table $b$ in the manner shown, or the post $c$ may be suspended from the floor above, leaving an open space between the table and the bottom end of the post, as is common in the construction of scroll-saws, to give perfect unlimited freedom to the movement of the material. The frame A is fitted with blocks B B', which constitute a part of the frame, and on which the arms of the saw roll. Their front faces are in the same plane, and the upper one may be adjustable vertically to admit of the introduction of different lengths of saws. C is the saw. It is connected to the frame A by the vibrating rolling arms D D', which are made, preferably, of light stamped plates, connected closely together where they join the saw, and separate sufficiently where they press against the blocks, to give a broad base, as shown. The arms are connected to the saw by pins $c'$ $c''$, the connection at the top admitting of the saw being detached to pass through holes in the work. The upper arm D is secured to the block in the same manner as the lower one D'.

The connection is made as follows: A link, E, is hinged to the block B at $e$, and to the arm D at $e'$. A bent spring, F, serves the double purpose of pressing the link so as to force the arm D against the face of the block B, and also to give the upward stroke to the saw. The latter of the two, however, is not necessary where the saw is operated by a stiff connecting-rod, it being only necessary then to use a spring of a character adapted only to keep the arms against the face of the block.

It will be seen that, owing to the width of the link E and the character of its connection to the block and arm, the arm cannot twist or move laterally, and is confined to a vibratory rolling motion, which gives the necessary rectilinear reciprocating motion to the saw, accompanied by very slight friction.

G is the driving-shaft, properly journaled in the frame. Its plate H is fitted with a crank-wrist, I, for driving the saw.

In order to provide a connection between the saw and its driving-crank wrist which will have but little power to cause vibration of the machine under high speed, we use a catgut pitman, J, or equivalent flexible material. As this pitman, when in connection with a machine having a spring to carry the saw through the upward stroke, is used to pull the saw through the downward stroke only, the flexibility of it is no objection.

Claims.

1. The combination of the ways B B', saw C, rolling arms D D', links E E', and suitable springs F to confine the arms to the prescribed path on the ways, substantially as and for the purpose set forth.

2. In combination with the frame A, saw C, arms D D', and links E, the springs F, adapted not only to press the arms against the frame, but to give the upward stroke to the saw.

In testimony of which invention we hereunto set our hands.

HUGH H. HUMPHREY.
H. BICKFORD.

Witnesses:
FRANK MILLWARD,
J. L. WARTMANN.